Dec. 24, 1968  D. RALL  3,417,617
FLUID STREAM TEMPERATURE SENSOR SYSTEM
Filed Dec. 13, 1965
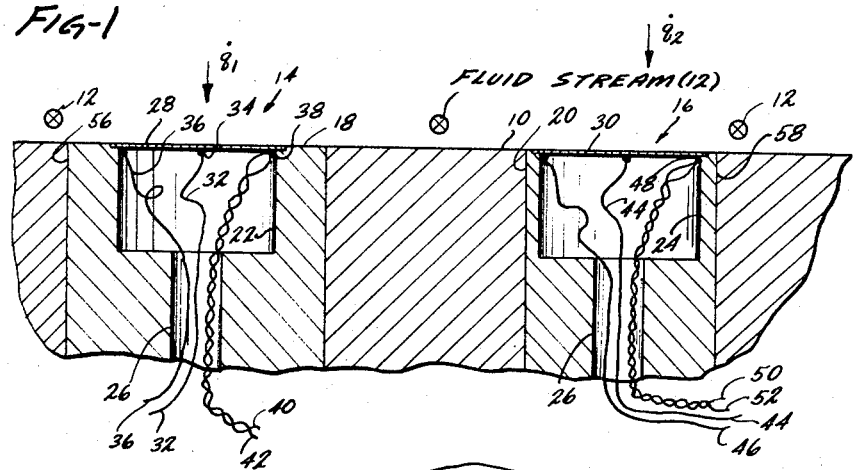
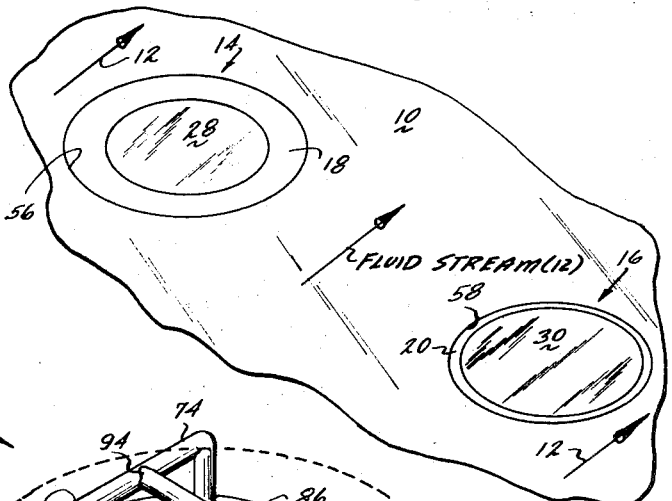
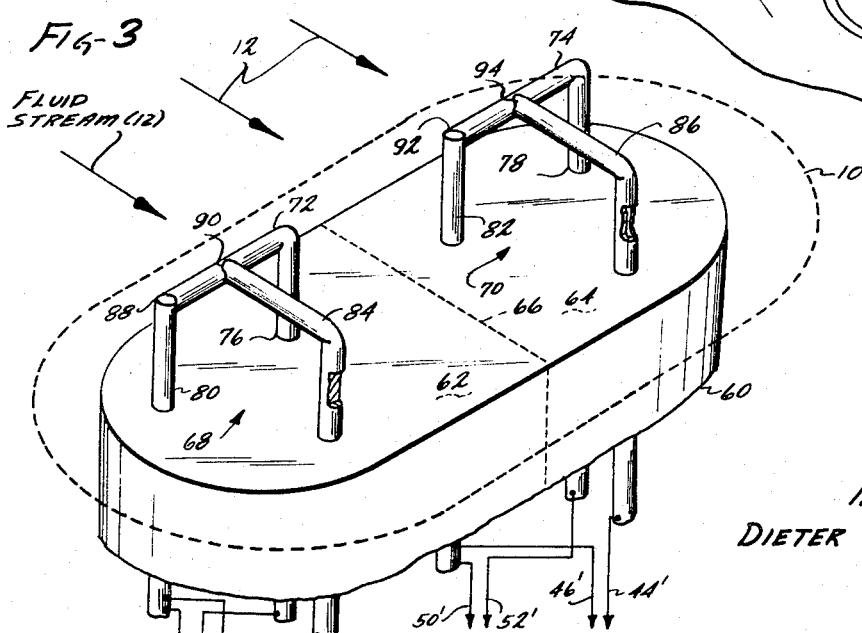
INVENTOR
DIETER RALL
BY Nilson, Robbins & Anderson
ATTORNEYS

# United States Patent Office 3,417,617
Patented Dec. 24, 1968

3,417,617
FLUID STREAM TEMPERATURE SENSOR SYSTEM
Dieter Rall, 1133 N. Circle Drive,
Whittier, Calif. 90601
Filed Dec. 13, 1965, Ser. No. 513,201
3 Claims. (Cl. 73—341)

ABSTRACT OF THE DISCLOSURE

A fluid stream temperature responsive transducer having two thermal sensors with different heat exchange rates, the outputs of which are utilized to determine the solution to two heat transfer equations, disclosed sensors include: foil calorimeters with differently sized heat sinks and protruding rod-like sensors, wherein one rod is hollow to provide the desired heat exchange rate difference.

---

This invention relates generally to temperature sensing apparatus and more particularly to such sensors and systems for use in measuring temperatures in fluid streams at extreme temperatures.

Although the present invention finds particularly useful application in the field of temperature measurement in extremely high temperature fluid bodies such as, for example, rocket exhaust nozzle streams and the like, and although, in the cause of clarity and brevity much of the discussion of examples of the invention herein will be directed thereto, it is to be expressly understood that the advantages of the invention are equally well manifest in other fields of temperature measurement such as, for example, at extremely low temperatures or at relatively ordinary temperatures in environments wherein conventional temperature indicators are found to be subject to undesirable limitations or other disadvantages.

A general, substantially universal, prior art approach to measurement of temperature of a fluid substance is to immerse a sensor of the character having an indication parameter such as mercury expansion, thermo resistance, thermo electric currents, or the like which requires that a temperature equilibrium be achieved between the sensing portion of the "thermometer" and the fluid being measured.

Obviously the time constant inherent in the particular sensing parameter constitutes a limitation in the capability of measuring temperature fluctuations with the particular instrument. Similarly, transients and short duration amplitude peaks or dips cannot be "followed" by this general type of instrument.

Of greater interest here, however, because it represents problems of greater difficulty and sophistication, is the effectively absolute limitation encountered when such temperature extremes are involved that the sensing material either is structurally deleteriously affected or its sensing parameters are ineffective in the temperature ranges of interest; for example, in the case of thermo resistance, the curve of temperature versus resistance assumes a useless or non-existent slope.

Another serious difficulty even if, in a particular application, the other limitations are overcome, is that a temperature probe at equilibrium with a hot gas stream will generally be emitting significant heat by thermal radiation. Accordingly, the sensing material, although in equilibrium with the stream, is not at the temperature of the stream, and hence produces errors. A possible cure is to provide extensive radiation shielding around the sensor in the stream; but any such shield, if effective, interferes with the free circulation of the fluid about the sensor surfaces. Consequently a deleterious effect of the radiation shield means is that the rapid temperature fluctuations in the fluid stream which could otherwise be detected by the particular instrument are masked or blurred. It may be noted, in this connection, that since heat emitted from a black body is proportional to the fourth power of the temperature of the emitting body, any decrease in temperature thereof provides great returns in terms of reduction of such radiation effects and of the instrument errors attributable thereto.

Accordingly it is an object of the present invention to provide a temperature sensing system which is not subject to these and other limitations and disadvantages incumbent with the prior art systems and techniques.

It is another object to provide such apparatus which does not require that the sensing materials achieve or approach the temperature of the fluid under observation.

It is another object of the present invention to provide such apparatus which is exceedingly rapid in response to temperature fluctuations in the fluid body being observed.

It is another object to provide such a system which may with high accuracy readily, repeatedly, and continuously detect or monitor, without suffering deleterious effects on the instrument, temperatures in hot gas streams of the order of more than 5,000° F.

It is another object of the invention to provide such apparatus which is mechanically rugged and reliable for long term use without recalibration even after very extensive use in the field or research laboratory.

It is another object to provide such a system which is clearly a precision instrument exhibiting only known, repeating, or constant errors which are readily calibrated out by the manufacturer.

It is another object to provide such apparatus which is relatively simple and inexpensive to manufacture.

Briefly, in acordance with the structural aspects of one example of the invention, these and other objects are achieved by a system of two heat flux detectors which are symmetrically exposed to the hot gas stream and which are geometrically identical as seen from the hot stream. Furthermore in this example the metallurgical composition of the two heat flux detectors are designed to be substantially identical.

Because of the specified geometry, metallurgical composition, and disposition in the stream, the transfer coefficient from the stream into the flux meters may accurately be assumed to be equal for both instruments. However, due to internal differences in the structure of the flux meters the actual magnitude of heat flux absorbed by the instruments is different. When, for example, the sensors each comprise an elongated probe exposed to the hot gas flow with one end of each force cooled to a known temperature and the opposite end of each cooled to a degree determined by the effective thermal conductivity of the probe along its length, the thermal conductivity of each probe may be made different, without affecting its surface heat absorption coefficient. This may be accomplished for example by having one probe fabricated of solid metal and the other of hollow tubing of the same metallurgical substance.

By measuring the hot and relatively cool ends of each probe, the heat flow along the length of the probe can be readily expressed as a function of the temperature of the hot stream. With two such expressions, one for each probe unit, and two unknowns, an equation for the hot stream temperature in terms of the cooler, measured temperatures may be readily derived as shown below.

Further details of these and other novel features and their principles of operation as well as additional objects and advantages along with other examples of the invention will become apparent and be best understood from a consideration of the following description taken in connection with the accompanying drawing which are all presented by way of illustrative example only and in which:

FIGURE 1 is a cross-sectional view of a fluid stream temperature sensor system constructed in accordance with the principles of the present invention;

FIGURE 2 is a perspective view of the structure of FIGURE 1 as viewed from the fluid stream; and FIGURE 3 is a similar perspective view of an alternative example of a stream temperature sensor system also constructed according to the structural concepts of the invention.

With specific reference now to the figures in detail it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the apparatus in more detail than is necessary for a fundamental understanding of the invention, the description taken with the drawing making apparent to those skilled in the arts of heat and temperature instrumentation how the several forms of the invention may be embodied in practice. Specifically, the detailed showing is not to be taken as a limitation upon the scope of the invention which is defined by the appended claims forming, along with the drawing, a part of the specification.

In FIGURE 1 an example of the invention is illustrated which includes a structural base or wall 10 the upper, as viewed in the drawing, boundary of which may, for example, be the inner wall of a rocket engine exhaust channel along which a hot gas stream 12 is indicated as flowing in the direction of normal, into the plane of the drawing. A cooperating pair of rapid response calorimeter type sensors 14, 16 are mounted flush with the upper boundary of the wall 10 so that they do not significantly interfere with the smooth flow of the stream 12 thereover while at the same time being thermally closely coupled to the heat flux of the body of the hot stream.

Each of the sensors 14, 16 includes a heat sink body member 18, 20, respectively, fabricated in this example of copper and which is formed with a short, cylindrical, clearance bore 22, 24, respectively. Each sink body member is also provided with an electrical lead access bore 26 which communicates through its respective heat sink body member to the bottom of the clearance bore.

Each of the sensors 14, 16 further includes a sensing foil disc 28, 30, respectively, formed in this example of constantan. The sensing disc is, in each case, metallurgically bonded, as by thermal fusion, along its circular periphery to the corresponding circular edge of the clearance bore 22 or 24. Thus the boundary between each sensing foil and its associated heat sink body member constitutes a circular, convoluted thermocouple junction of copper-constantan composition.

With regard to the sensor 14, a copper lead 32 is shown extending through the lead access bore 26 and terminating in a spot thermocouple junction 34 at the center of the sensing disc 28. For schematic purposes a copper lead 36 is shown also extending through the access channel and connected to the sensing disc at its edge. The lead, in this example, can be provided by the heat sink body member 18 since both it and the lead 36 are of copper and both are electrically connected to the circular thermocouple junction formed about the edge of the sensor disc.

Independently from the above thermocouple junctions, a thermocouple junction 38 is formed by the junction of a copper-constantan pair of leads 40, 42, providing a reference-temperature indication. The thermocouple junction 38 is bonded, in thermal contact, to the edge of the sensor disc 28.

Thus, it may be understood that the electro-motive force (EMF) between leads 40, 42 indicate the reference temperature of the edge of the sensing foil disc; while the EMF between the leads 32, 36 provides an indication of the temperature difference between the center and edge portions of the sensing disc.

In operation, when the foil sensing disc 28 is exposed to the heat flux of the hot fluid stream 12, the greater the amount of heat absorbed by the disc, the greater will be the temperature difference between its center and edge due to the thermo resistance of the constantan foil between its center and edges. The quantitive heat per unit time absorbed by the foil is designated $\dot{q}_1$ and is affected by the magnitude of the temperature of the hot fluid stream 12 in a manner discussed below.

Similarly to the sensor 14, the second component sensor 16 is provided with a central copper lead 44 which extends through the access channel 26 and forms a copper-constantan thermocouple junction at the center of the sensing foil disc 30. A second lead 46, similar to lead 36 associated with the first component sensor, is coupled electrically to the edge of the sensing disc 30. A thermocouple junction 48 formed at the intersection of a copper-constantan pair 50, 52 is bonded in thermal contact with the edge of the sensing disc 30. The heat flux to be measured is designated $\dot{q}_2$.

Referring to FIGURE 2 the sensor system of FIGURE 1 is shown in perspective as viewed from within the rocket engine, of this example, looking toward its wall 10. The flush mounting of the sensors 14, 16 is apparent as is their symmetrical disposition across the path of the stream flow whereby neither sensor affects the thermodynamics of the stream as seen by the other sensor. In the view of FIGURE 2 the diameters of the sensing foil discs 28, 30 are seen in this example to be at least substantially equal, with the associated heat sink body member 18 associated with the sensor 14 being relatively larger than the heat sink body member 20 associated with the sensor 16. In practice those portions of the sensing foils and the heat sink body members which are exposed to the heat flux of the stream are gold coated to maximize the reflection of any unbalanced radiation between the stream and the sensor due to the sensor services being of temperatures different from that of the stream and from each other.

Although, in this particular example, the sensing foils of the two component sensors 14, 16 are identical with respect to their metallurgical composition, reflective coating, thickness, and diameter, the heat flow path between the stream 12 and the heat sink body members 18, 20 is different because the thermo path represented by the length and annular thickness of the collar extension portions 56, 58 is significantly more conductive for the former. Thus, in the environment of the hot fluid stream 12, the sensing foil 30 of the sensing component 16 will operate at a higher temperature than will that of the sensing foil 28 of the sensor component 14.

As thermal energy is transferred from the stream 12 to each of the heat sink body members, the following equations express the energy exchange relationships:

$$\dot{q}_1 = h_1(T_g - T_{w1})$$

$$\dot{q}_2 = h_2(T_g - T_{w2})$$

where:

$\dot{q}_1$ and $\dot{q}_2$ = time rate of heat transfer between fluid and sensors 14, 16 respectively;

$h_1$ and $h_2$ = convective heat transfer coefficient at surface of sensors 14, 16 respectively;

$T_g$ = temperature of fluid stream 12;

$T_{w1}$ and $T_{w2}$ = effective average sensor temperature.

Since both sensors 14, 16 are geometrically identical at their heat transfer surfaces, and since $h$ is a hydrodynamic function, $h_1 = h_2$.

Accordingly, the two initial, transfer equations above may be divided, $$\frac{\dot{q}_1}{\dot{q}_2} = \frac{T_g - T_{w1}}{T_g - T_{w2}}$$

and multiplied by the right hand denominator, $$\frac{\dot{q}_1}{\dot{q}_2}T_g - \frac{\dot{q}_1}{\dot{q}_2}T_{w2} = T_g - T_{w1}$$

or $$\frac{\dot{q}_1}{\dot{q}_2}T_g - \frac{\dot{q}_1}{\dot{q}_2}T_{w2} - T_g = -T_{w1}$$

than by factoring out $T_g$, $$T_g\left(\frac{\dot{q}_1}{\dot{q}_2} - 1\right) - \frac{\dot{q}_1}{\dot{q}_2}T_{w2} = -T_{w1}$$

or $$T_g\left(\frac{\dot{q}_1}{\dot{q}_2} - 1\right) = \frac{\dot{q}_1}{\dot{q}_2}T_{w2} - T_{w1}$$

dividing by $$\left(\frac{\dot{q}_1}{\dot{q}_2} - 1\right)$$

$$T_g = \frac{\frac{\dot{q}_1}{\dot{q}_2}T_{w2} - T_{w1}}{\frac{\dot{q}_1}{\dot{q}_2} - 1}$$

or, by multiplying numerator and denominator by $\dot{q}_2$, $$T_g = \frac{(\dot{q}_1 T_{w2}) - (\dot{q}_2 T_{w1})}{\dot{q}_1 - \dot{q}_2}$$

Hence, the fluid temperature can be determined from the measured temperature difference between the center and edge of each sensor which difference is proportional to the rate of heat transfer between the sensor and the fluid, and the absolute temperature at the edge of each sensor disc. It should be noted that the temperature of the sensors need not be at equilibrium temperature of the fluid and can, in fact, be considerably colder or warmer operating at or near room ambient temperature. If for example cooling is provided for the sensor heat sink body members the sensors can conveniently and readily operate in a fluid temperature of 5,000° F. or higher.

This latter factor of not requiring that the sensing materials be at the equilibrium temperature of the hot fluid stream is a significant one in causing the sensor system to be superior to other or conventional fluid stream temperature measuring systems or devices. An additional advantage of the system hereof is that the fluid stream temperature calculated by the last equation above can be substituted in either of the initial transfer equations to allow calculation of $h$, the convective heat transfer coefficient, thus making instrument systems constructed in accordance with the principles of the present invention useful as a device to determine the heat transfer coefficient between a fluid and a surface for various flow conditions and/or surface conditions.

It may further be noted that, although the $\dot{q}$'s are different in the above example by virtue of the different geometries of the collar extension portions 56, 58 of the sensors 14, 16 which maintains one sensing foil at a different temperature from the other, this temperature difference may be accomplished by having both sensors totally identical except that the thickness of the sensing foil 28 is slightly greater than that of the sensing foil 30. Another approach is to force cool one of the heat sink body members 18, 20 or force cool them at different rates as by fluid or other means. It should further be noted that when desired, the heat sink body members may be force heated as by electrical or fluid means for purposes, for example, of measuring cold stream temperatures.

In addition the thermo paths may be made different, without affecting heat transfer coefficient, by varying the metallurgical composition of the sensing foils or of the heat sink body members, by varying the diameters of the sensing foils, or by other techniques of maintaining the sensing foils at different temperatures in the environment of the flow of the hot fluid stream 12.

In practice, the sensor system is manufactured and readily and accurately calibrated at the factory. It may then be transferred to its installation with no deleterious effects on its accuracy or calibration, and, additionally, with no significant influence on its environment.

It should further be understood that although electrical indicating and recording instrumentation for operating on the signal outputs of the component sensors are not specifically shown or discussed herein, the appropriate means and techniques are readily available to those skilled in the instrumentation arts and therefore need not be presented here for a clear understanding of the structure and operation of the invention.

Referring to FIGURE 3, an alternative example of the invention is illustrated in which a unitary heat sink body member 60 is mounted with its top surface flush with the wall 10, shown in this example in dashed lines. For purposes discussed above the heat sink body 60 may be divided into two portions 62, 64 which are thermally isolated, to some degree, from each other as indicated by the dashed line 66 circumscribing the otherwise apparently unitary body member 60 about its mid portion. It is pointed out, however, that in some applications it is desirable, for mechanical and other reasons, to have a unitary heat sink body member which may also serve as a mounting base for a pair of sensor components 68, 70 which each include an elongate sensing element 72, 74 interposed mutually symmetrically transversely in the fluid stream 12. Each of the elongate sensing elements is thermally connected to the heat sink body member 60 at its base end 76, 78, respectively, and to a connecting, stand-off member 80, 82, at its other end. The sensing elements 72, 74 may be fabricated of constantan; and they correspond analogously to the sensing foil discs 28, 30 of the example of FIGURE 1. The stand-off members 80, 82 may be formed of copper.

An intermediate connecting element 84, 86 is disposed between the heat sink body member 60 and a mid portion of respective ones of the sensing element 72, 74. The metallurgical composition of the intermediate connecting elements 84, 86 may be the same as that of the elements 80, 82 so that the electrical connections between the sensing elements and each of their associated connecting elements constitutes a copper-constantan thermo-couple junction indicated at 88, 90, 92, 94. Carrying the analogy with the example of FIGURE 1 further, the thermocouple junctions 88 and 92 correspond to those at the sensing foil disc edges of FIGURE 1; while the thermocouple junctions 90 and 92 correspond to the center thermocouple junctions of the sensing foil disc example. Accordingly, the electrical leads connected to the three elements of each of the sensor components 68, 70, which correspond functionally to the electrical leads of the previous figure, are given in FIGURE 3 the like reference numeral primed, thus the EMF between lead 40', 42' or 50', 52' is an indication of the "cool edge" temperature, while that between leads 32', 36' or 44', 46' represents the temperature difference between the "hot center" and the "cool edge."

The EMF's so developed may be sensed and manifest by various apparatus as well-known in the prior art. Specifically, for example, as disclosed in U.S. Patent 3,139,752.

The heat flow paths may be made different, to provide the desired heat transfer equations as above, by making the elements of one component sensor, e.g. 68, of solid wire stock, while the other sensor, e.g. 70, is fabricated of hollow tubular stock of, however, like metallurgical composition and similar geometry. This structure is indicated by the small sectional portions of FIGURE 3.

The design of the example of the invention of FIGURE 3 offers advantages in permitting measurements of the stream within the center of the stream or, at least, at points spaced from the wall of the fluid container. A particular practical example of such an application is the conducting of a temperature profile or traverse across the exhaust duct of a jet duct of a jet engine.

There have thus been disclosed and described a number of examples of a fluid stream temperature sensor system which achieves the objects and exhibits the advantages set forth hereinabove.

What is claimed is:
1. In combination, an apparatus for providing electrical signals indicative of an environmental temperature, comprising:
  a first sensor component including, an elongate solid-rod sensing element to be subjected to said temperature, and a first standoff member connected to said solid-rod sensing element at an intermediate point thereof to provide a first thermocouple junction;
  a second sensor component including an elongate tubular sensing element to be subjected to said temperature and a second standoff member connected to said tubular sensing element at an intermediate point thereof to provide a second thermocouple junction;
  a heat sink body means for supporting said first sensor component and said second sensor component; and
  electrical means connected to said sensor components to provide said electrical signals therefrom.

2. An apparatus according to claim 1 wherein said heat sink body comprises a unitary member supporting said sensor components in symmetrical relationship.

3. An apparatus according to claim 2 wherein said sensing elements comprise constantan and said standoff members comprise copper.

References Cited

UNITED STATES PATENTS

| | | | |
|---|---|---|---|
| 3,286,524 | 11/1966 | Malone | 73—341 |
| 3,139,752 | 7/1964 | Giedt | 73—341 XR |
| 3,232,113 | 2/1966 | Malone | 73—355 |
| 3,280,626 | 10/1966 | Stempel | 73—355 XR |

OTHER REFERENCES

Gordon, R.: An Instrument for the Direct Measurement of Intense Thermal Radiation. In The Rev. Sci. Inst. vol. 24, No. 5, pp. 366–370, May 1953. Copy in Gp. 280.

S. CLEMENT SWISHER, *Acting Primary Examiner.*

F. SHOON, *Assistant Examiner.*

U.S. Cl. X.R.

73—355; 136—230